US012634895B2

(12) United States Patent (10) Patent No.: US 12,634,895 B2
Leinmueller et al. (45) Date of Patent: May 19, 2026

(54) COOPERATIVE INTELLIGENT TRANSPORT SYSTEM AND METHOD WITH CPM SIGNIFICANCE INDEX FOR REDUNDANCY MITIGATION

(71) Applicant: DENSO CORPORATION, Kariya-city (JP)

(72) Inventors: Tim Leinmueller, Eching (DE); Prachi Mittal, Eching (DE)

(73) Assignee: DENSO CORPORATION, Kariya-city (JP)

( * ) Notice: Subject to any disclaimer, the term of this patent is extended or adjusted under 35 U.S.C. 154(b) by 296 days.

(21) Appl. No.: 18/582,745

(22) Filed: Feb. 21, 2024

(65) Prior Publication Data

US 2024/0196375 A1 Jun. 13, 2024

Related U.S. Application Data

(63) Continuation of application No. PCT/JP2022/037750, filed on Oct. 10, 2022.

(30) Foreign Application Priority Data

Oct. 12, 2021 (EP) .................................... 21202059

(51) Int. Cl.
H04W 72/04 (2023.01)
H04W 4/40 (2018.01)
H04W 72/566 (2023.01)

(52) U.S. Cl.
CPC ......... *H04W 72/04* (2013.01); *H04W 72/566* (2023.01); *H04W 4/40* (2018.02)

(58) Field of Classification Search
None
See application file for complete search history.

(56) References Cited

U.S. PATENT DOCUMENTS

2016/0217333 A1* 7/2016 Ozawa ............. G08G 1/096783
2018/0249525 A1* 8/2018 Brahmi .................. G08G 1/161
(Continued)

FOREIGN PATENT DOCUMENTS

DE 102015105784 A1 10/2016
EP 3462754 A1 4/2019
(Continued)

OTHER PUBLICATIONS

U.S. Appl. No. 18/582,918, filed Feb. 21, 2024, Leinmueller et al.

*Primary Examiner* — Yaotang Wang
(74) *Attorney, Agent, or Firm* — Harness, Dickey & Pierce, P.L.C.

(57) ABSTRACT

A method of exchanging information between stations in a cooperative intelligent transport system uses a wireless communication channel. The method includes: detecting multiple objects present within a field of view of at least one sensor provided at a respective station or included in a shared message received from another station as being present in the vicinity of the station; obtaining object data of each detected object from said at least one sensor and/or said shared message; filling a collective perception message with object data of the objects; calculating a collective perception message significance index for each collective perception message filled with object data; determining available channel resources of said wireless communication channel; and transmitting collective perception messages in accordance with the available channel resources starting with a collective perception message with the highest collective perception message significance index.

13 Claims, 10 Drawing Sheets

(56)          References Cited

U.S. PATENT DOCUMENTS

| | | |
|---|---|---|
| 2021/0160323 A1 | 5/2021 | Nassor et al. |
| 2022/0248176 A1* | 8/2022 | Hwang ................... H04W 4/20 |
| 2022/0264265 A1 | 8/2022 | Kwak et al. |
| 2023/0288211 A1* | 9/2023 | Rech ................... B60W 60/001 |
| 2024/0323657 A1* | 9/2024 | Yang ....................... H04W 4/40 |

FOREIGN PATENT DOCUMENTS

| | | | |
|---|---|---|---|
| EP | 3829200 A2 | 6/2021 |
| EP | 3829200 A3 | 8/2021 |
| WO | WO-2021040352 A1 | 3/2021 |

\* cited by examiner

◁ Sensor FOV

⬚ Object

⟶ Direction of movement

◁ Sensor FOV

⬚ Object

COOPERATIVE INTELLIGENT TRANSPORT SYSTEM AND METHOD WITH CPM SIGNIFICANCE INDEX FOR REDUNDANCY MITIGATION

CROSS REFERENCE TO RELATED APPLICATIONS

The present application is a continuation application of International Patent Application No. PCT/JP2022/037750 filed on Oct. 10, 2022, which designated the U.S. and claims the benefit of priority from European Patent Application No. EP21202059.8 filed on Oct. 12, 2021. The entire disclosures of all of the above applications are incorporated herein by reference.

TECHNICAL FIELD

The present disclosure relates to information exchange in a cooperative intelligent transport system (C-ITS), and more specifically to a method, a cooperative intelligent transport system and a computer-implemented system of exchanging information between stations in a C-ITS using a wireless communication channel.

BACKGROUND

A known cooperative intelligent transport system (C-ITS) comprises of stations (e.g., vehicles and/or roadside units) that exchange information with each other using (direct) wireless communication, known as vehicle-to-x, or vehicle-to-everything, (V2X, direct).

SUMMARY

The present disclosure provides a method of exchanging information in a cooperative intelligent transport system between stations in said cooperative intelligent transport system using a wireless communication channel. The method comprising: detecting a plurality of objects present within a field of view of at least one sensor provided at a respective station or included in a shared message received from another station as being present in a vicinity of the station; obtaining object data of each detected object from said at least one sensor and/or said shared message; filling a collective perception message with object data of the plurality of objects; calculating a collective perception message significance index for each collective perception message filled with object data; determining available channel resources of said wireless communication channel; and transmitting collective perception messages in accordance with the available channel resources starting with a collective perception message with the highest collective perception message significance index.

BRIEF DESCRIPTION OF DRAWINGS

Objects, features and advantages of the present disclosure will become apparent from the following detailed description made with reference to the accompanying drawings. In the drawings.

DETAILED DESCRIPTION

V2X is a generic term for traffic networking, electronic communication of road users with each other in the forms of vehicle-to-vehicle (V2V), vehicle-to-infrastructure (V2I), vehicle-to-network (V2N) and vehicle-to-pedestrian (V2P). Wireless communication can be based on the IEEE 802.11 WLAN standard (the 802.11p extension, and e.g., its European profile ITS-G5) and is specifically termed WLAN-V2X. Alternatively, the wireless communication can be based on the 3GPP standards, specifically termed Cellular-V2X, C-V2X, or sidelink. In V2X, for example, safety and traffic messages, emergency and service data, toll billing and navigation as well as Internet and database content are exchanged. The aims of V2V include notifying drivers of critical and dangerous situations at an early stage, improving the vehicles' awareness of their surroundings, supporting the vehicles' driver assistance systems, and supporting cooperative automated mobility, thereby improving traffic safety and optimizing traffic flow.

The ITS stations (ITS-Ss) in the C-ITS share CAMs (Cooperative Awareness Messages (CAMs) to inform each other about their own position, kinematics, and other data. The ITS stations use DENMs (Decentralized Environmental Notification Messages) to inform each other on dedicated events, such as hard braking or obstacles on the road.

Figure 1:
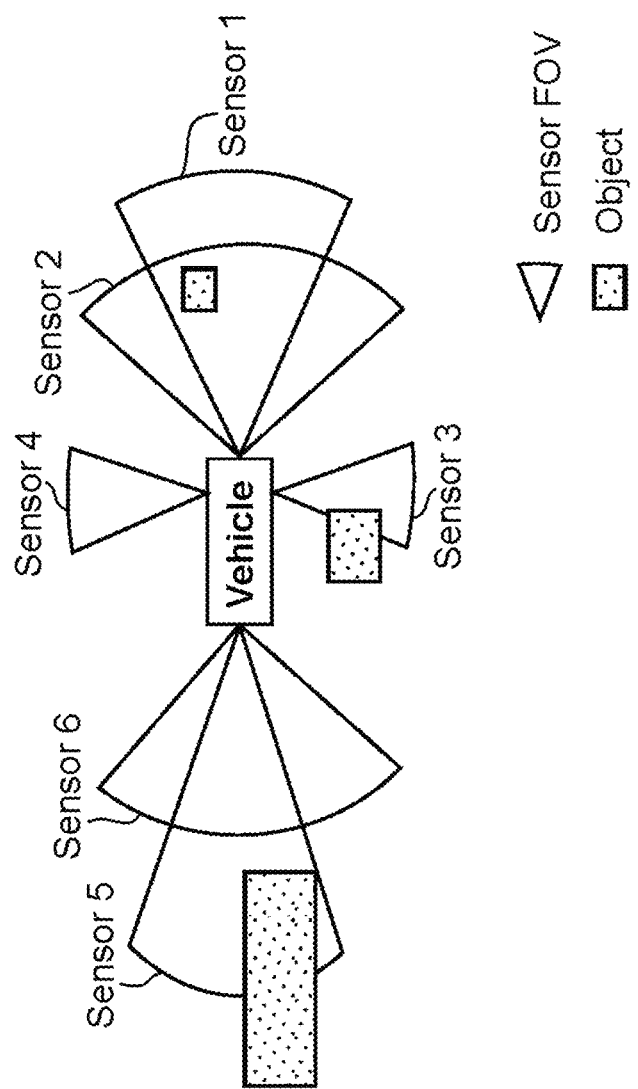
FIG. 1 illustrates an exemplary vehicle setup in which a vehicle is equipped with sensors each having a predetermined field-of-view and exemplary objects are located in the vicinity of the vehicle.

Another V2X message is the Collective Perception Message (CPM) that contains information about on-board sensors, such as field-of-views (FOVs), free-space, and the objects detected within the traffic environment by the on-board sensors of an ITS-S. FIG. 1 shows an example of a vehicle setup comprising a vehicle with sensors 1 to 6 each having a predetermined field-of-view. Exemplary objects are illustrated in the vicinity of the vehicle.

Figure 2:
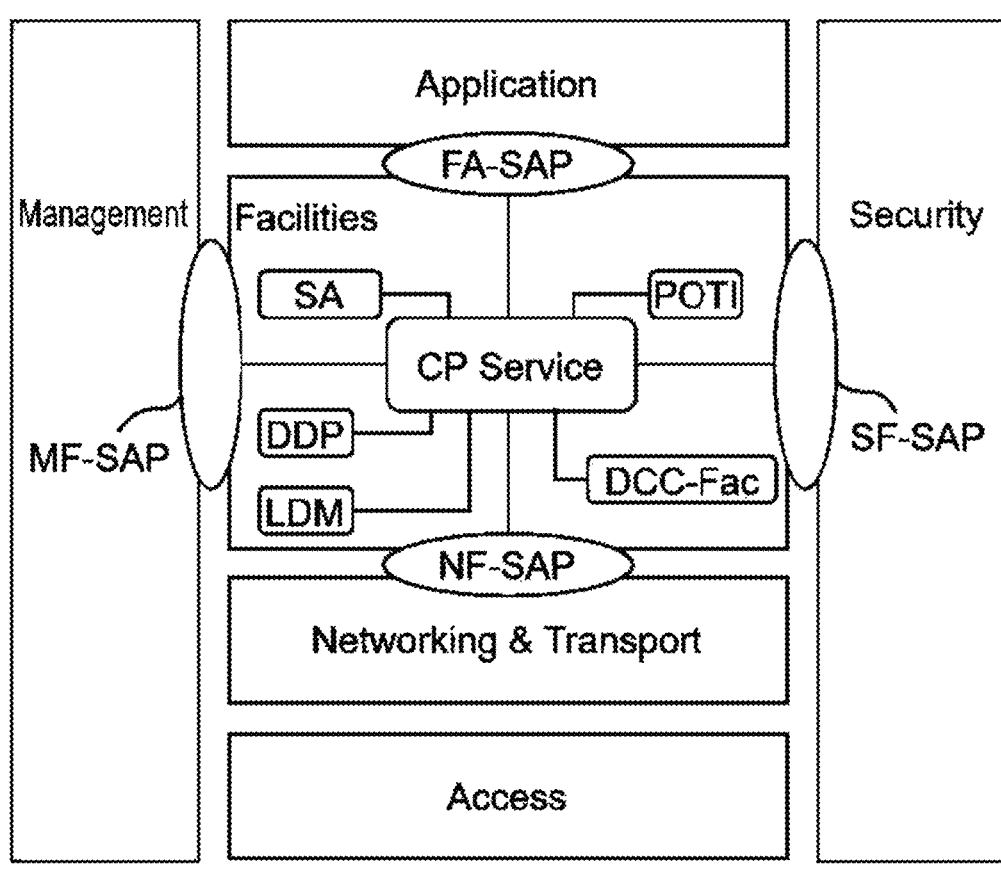
FIG. 2 illustrates the ETSI ITS-Stack and CPS in a CPS-centric view.
Figure 3:
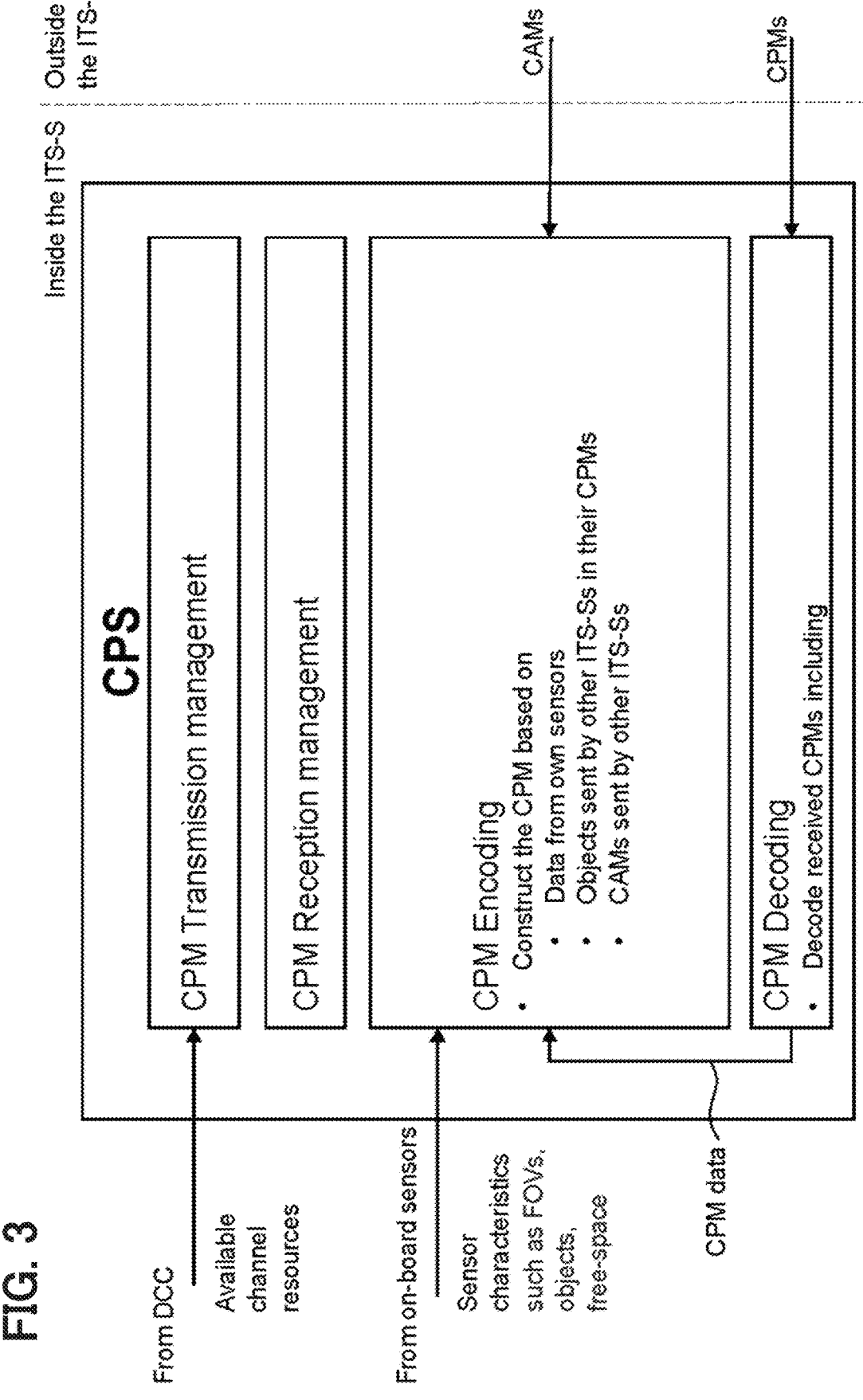
FIG. 3 illustrates functions of the CPS of FIG. 2 as specified in current ETSI standards.

CPMs are sent out periodically and contain information on one or more detected objects, field-of-views and other characteristics of vehicle on-board sensors such as e.g., a radar, a camera and the like. CPMs are composed by the Collective Perception Service (CPS) within the facility layer of the ETSI ITS stack, as shown in FIG. 2 illustrating the ETSI ITS-Stack and CPS in a CPS-centric view. The current functions of CPS are illustrated in FIG. 3 and will be further referred to in connection with FIG. 4 below.

In C-ITS, a concept of Decentralized Congestion Control (DCC) is employed to handle a congested channel. DCC operates at all layers of the ETSI ITS stack.

In the technical field referred to so far, document DE 10 2015 1 057 84 A1 discloses, in a distributed system for detecting and protecting vulnerable road users, the sending of object information about vulnerable road users and controlling the transmission of this information based on object kinematics, novelty, detection possibility by others and the like.

In addition, document EP 3 462 754 A1 presents an apparatus and a method V2X communication arranged to detect if two objects are the same in order to avoid duplicating them in a CPM.

In addition, document WO2021/040352 A1 discloses a method by which a device transmits and receives a CPM in wireless communication system for supporting sidelink, and a device therefor. In this method, it is detected if an object perceived by an ITS-S has already been transmitted by another ITS-S and sending out of such an object is avoided based thereon.

The present disclosure provides a method, a cooperative intelligent transport system and a computer-implemented system capable of ensuring that, specifically for CPM and in a congested V2X wireless channel, packets including significant information safely transmitted and prevented from being dropped.

According to one embodiment of the present disclosure, a method of exchanging information in a cooperative intelligent transport system between stations in the cooperative intelligent transport system (C-ITS) uses a wireless communication channel. The exchanging of information comprises transmitting, receiving, processing and/or discarding a collective perception message (CPM) containing information about on-board sensors and/or objects detected by the on-board sensors within a traffic environment. The method according to the first aspect comprises detecting a plurality of objects present within a field of view (FOV) of at least one sensor provided at a respective station or included in a shared message received from another station as being present in the vicinity of the station, obtaining object data of each detected object from the at least one sensor and/or the shared message, filling a collective perception message (CPM) with object data of the objects, calculating a collective perception message significance index (CPM-SI) for each collective perception message (CPM) filled with object data of the objects, determining available channel resources of the wireless communication channel, and transmitting collective perception messages (CPMs) in accordance with the available channel resources starting with a CPM with the highest collective perception message significance index (CPM-SI).

Before describing embodiments of the present disclosure, technical problem in the related art will be described.

Figure 6:
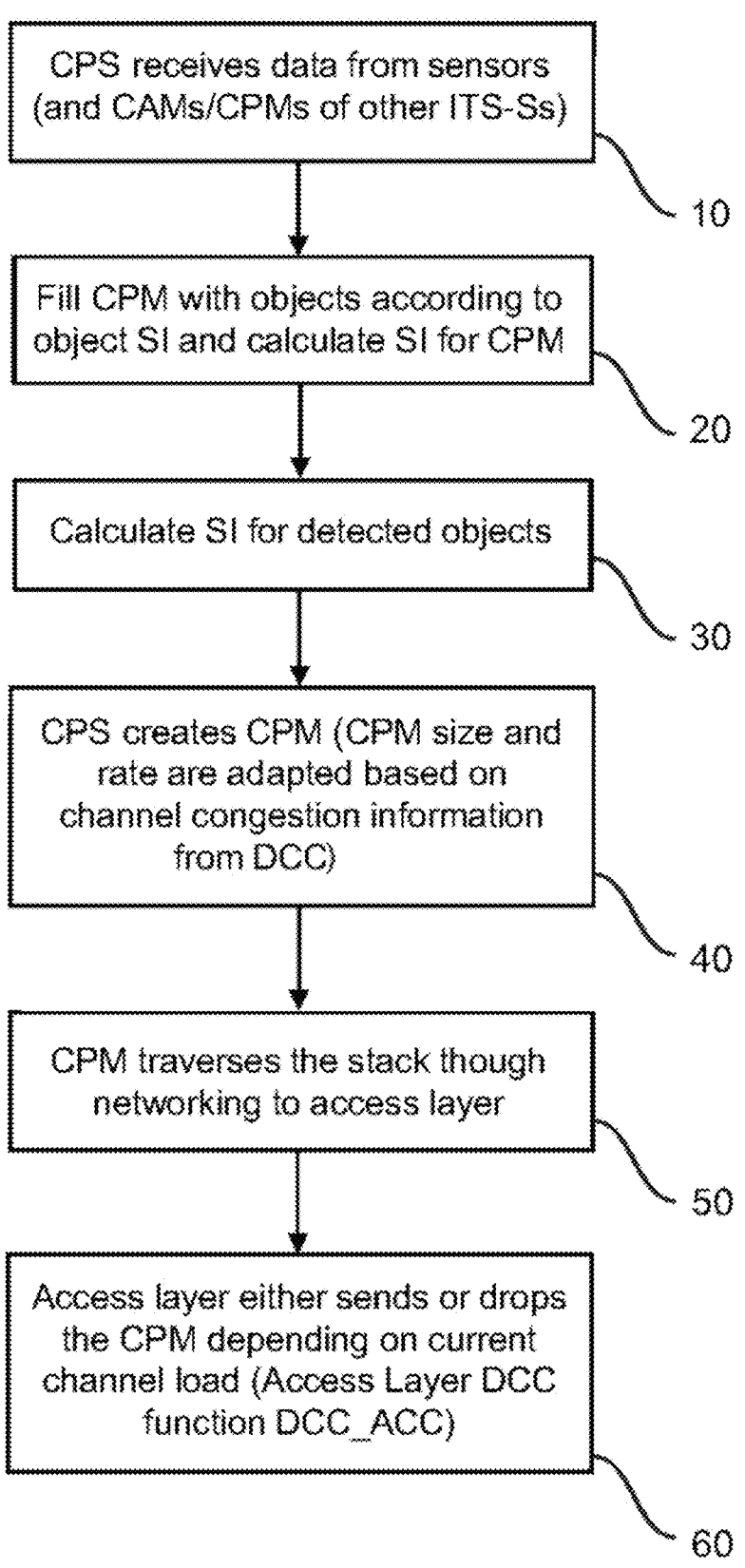
FIG. 6 illustrates the interlinking of CPM transmission and DCC executed at an ITS-S at layers of the ETSI ITS stack including the concept of a significance index introduced into CPMs according to the embodiment.

A CPM can contain a large number of detected objects, leading to a relatively large CPM size, so that even at a lower transmission rate, sending out CPMs can result in congestion of the V2X wireless channel. In a congested V2X wireless channel, DCC is executed at every ITS-S (at different layers of ETSI ITS stack). DCC determines a certain channel capacity for the ITS-S, depending on the level of congestion. If the sum of all messages generated by the ITS-Ss exceeds the aforementioned capacity, the DCC access layer functionality (DCC_ACC) drops packets indiscriminately, i.e., without any intelligence about their content or the significance of the information within. Specifically for CPM, this means a packet with significant information (e.g., objects with high relevance to the safety of an ITS-S) may be dropped. The interlinking of CPM transmission and DCC is shown in FIG. 6.

The present disclosure provides a method, a cooperative intelligent transport system and a computer-implemented system capable of ensuring that, specifically for CPM and in a congested V2X wireless channel, packets including significant information safely transmitted and prevented from being dropped. In the present disclosure, the information exchange comprises transmitting, receiving, processing and/or discarding a collective perception message (CPM) containing information about on-board sensors and/or objects and/or free-space detected by the on-board sensors within a traffic environment.

According to a first aspect of the present disclosure, a method of exchanging information in a cooperative intelligent transport system between stations in the cooperative intelligent transport system (C-ITS) uses a wireless communication channel. The exchanging of information comprises transmitting, receiving, processing and/or discarding a collective perception message (CPM) containing information about on-board sensors and/or objects detected by the on-board sensors within a traffic environment. The method according to the first aspect comprises detecting a plurality of objects present within a field of view (FOV) of at least one sensor provided at a respective station or included in a shared message received from another station as being present in the vicinity of the station, obtaining object data of each detected object from the at least one sensor and/or the shared message, filling a collective perception message (CPM) with object data of the objects, calculating a collective perception message significance index (CPM-SI) for each collective perception message (CPM) filled with object data of the objects, determining available channel resources of the wireless communication channel, and transmitting collective perception messages (CPMs) in accordance with the available channel resources starting with a CPM with the highest collective perception message significance index (CPM-SI).

According to a second aspect of the present disclosure, which depends on the first aspect, an object significance index (O-SI) is calculated for each detected object based on the object data, and a collective perception message (CPM) is filled with object data of the objects in accordance with their calculated object significance index.

According to a third aspect of the present disclosure, which depends on the second aspect, the object significance index (O-SI) is calculated by adding values for different object data factors and normalizing the result to integer type significance index (SI) value. The integer-type significance index value is in one embodiment configured to be between 1 and 10, without however being limited thereto.

According to a fourth aspect of the present disclosure, which depends on the second aspect or the third aspect, the collective perception message significance index (CPM-SI) is calculated by taking an average of object significance indices (O-SIs) of all objects within the collective perception message and is an integer type parameter with a value. The integer-type significance index value is in one embodiment configured to be between 1 and 10, without however being limited thereto.

According to a fifth aspect of the present disclosure, which depends on any of the first to fourth aspects, the object significance index is calculated based on at least one of kinematics of an object, a novelty of detection of an object, an elapsed time since a last update of an object, a classification of an object, and a confidence of detection of an object.

According to a sixth aspect of the present disclosure, which depends on any of the first to fifth aspects, the object significance index is calculated based on a need of other stations, the need including at least one of kinematics of an object, a difficulty or impossibility of detection by a neighboring station, a condition of occlusion of an object, an object being on the boundary or outside of a field of view of a sensor in a neighboring vehicle, a low confidence of detection at a neighboring station, and differing detected locations between different stations.

According to a seventh aspect of the present disclosure, which depends on any of the first to sixth aspects, the wireless communication is direct vehicle-to-x (V2X) communication.

According to an eighth aspect of the present disclosure, which depends on any of the first to seventh aspects, the collective perception messages (CPMs) are sent out periodically.

According to a ninth aspect of the present disclosure, which depends on any of the first to eighth aspects, the available channel resources are in relation to a channel load, and if the channel load is determined to be above a predetermined threshold value indicating a congested channel, the collective perception messages (CPMs) are transmitted starting with a CPM with the highest collective perception message significance index (CPM-SI).

According to a tenth aspect of the present disclosure, a cooperative intelligent transport system for exchanging information between stations in the cooperative intelligent transport system (C-ITS) uses a wireless communication channel. The exchanging of information comprises transmitting, receiving, processing and/or discarding a collective perception message (CPM) containing information about on-board sensors and/or objects detected by the on-board sensors within a traffic environment. The cooperative intelligent transport system according to the ninth aspect comprises at least one sensor provided at a respective station and arranged to detect a plurality of objects present within a field of view (FOV), a reception unit arranged to receive a shared message from another station as, the shared message including information on at least one object being present in the vicinity of the station, a data obtaining unit arranged to obtain object data of each detected object from the at least one sensor and/or the shared message, a filling unit arranged to fill a collective perception message (CPM) with object data of the objects, a second calculating unit arranged to calculate a collective perception message significance index (CPM-SI) for each collective perception message (CPM) filled with object data of the objects, a determining unit arranged to determine available channel resources of the wireless communication channel, and a transmission unit arranged to transmit collective perception messages (CPM) in accordance with the available channel resources starting with a CPM with the highest collective perception message significance index (CPM-SI).

According to an eleventh aspect of the present disclosure, a computer-implemented system for exchanging of information in a cooperative intelligent transport system between stations in the cooperative intelligent transport system (C-ITS) uses a wireless communication channel. The exchanging of information comprising transmitting, receiving, processing and/or discarding a collective perception message (CPM) containing information about on-board sensors and/or objects detected by the on-board sensors within a traffic environment. The system according to the tenth aspect comprises a memory for storing instructions which, when carried out by a processor, cause the processor to perform detecting a plurality of objects present within a field of view (FOV) of at least one sensor provided at a respective station or included in a shared message received from another station as being present in the vicinity of the station, obtaining object data of each detected object from the at least one sensor and/or the shared message, filling a collective perception message (CPM) with object data of the objects, calculating a collective perception message significance index (CPM-SI) for each collective perception message (CPM) filled with object data of the objects, determining available channel resources of the wireless communication channel, and transmitting collective perception messages (CPM) in accordance with the available channel resources starting with a CPM having the highest collective perception message significance index (CPM-SI).

It is understood that the above second to ninth aspects are likewise applicable to the systems according to the tenth and eleventh aspects of the present disclosure.

The present disclosure is designed to advantageously provide for a consideration of additional parameters (e.g. detection confidence, location discrepancy etc.) for significance determination, a consideration of any type of objects (not just e.g. VRUs), a consideration of any type of ITS-S (not just e.g. vehicles), a consideration of Area perception Requests (APR), a transmission of the significance parameter itself, a selective aggregation of objects (as opposed to single message per object, or aggregation of all detected objects in one message), and a consideration of a specific V2X message (CPM).

In the above concept, it is understood that in case of limited processing capacity, an arrangement may be such that that at least received CPMs with a high CSI are processed first.

As further understood, in the above context and without being limited thereto, ITS Ss at least comprise vehicles and/or roadside units in the traffic environment the aforementioned aspects are applicable to.

As mentioned at the outset, V2X is a generic term for traffic networking, electronic communication of road users with each other in the forms of vehicle-to-vehicle (V2V), vehicle-to-infrastructure (V2I), vehicle-to-network (V2N) and vehicle-to-pedestrian (V2P). Wireless communication can be based on the IEEE 802.11 WLAN standard (the 802.11p extension, and e.g., its European profile ITS-G5) and is specifically termed WLAN-V2X. Alternatively, the wireless communication can be based on the 3GPP standards, specifically termed Cellular-V2X, C-V2X, or sidelink. In V2X, for example, safety and traffic messages, emergency and service data, toll billing and navigation as well as Internet and database content are exchanged. The aims of V2V include notifying drivers of critical and dangerous situations at an early stage, improving the vehicles' awareness of their surroundings, supporting the vehicles' driver assistance systems, and supporting cooperative automated mobility, thereby improving traffic safety and optimizing traffic flow.

Two alternative access layer technologies for ITS have been defined by the Institute of Electrical and Electronics Engineers (IEEE) and the Third Generation Partnership Project (3GPP), respectively.

The first approach is often referred to as Dedicated Short-Range Communication (DSRC), which supports vehicular ad-hoc connectivity using Wireless Local Area Network (WLAN) technologies standardized as IEEE 802.11p, which is the basis for the European standard ETSI ITS-G5. The second approach is Cellular-based V2X (C-V2X), a proposal by the 3GPP, based on Long-Term Evolution (LTE), also known as LTE-V2X or sidelink.

In this context, cooperative awareness within road traffic means that road users and roadside infrastructure are informed about each other's position, dynamics and attributes. Road users are all kind of users on or near the road that play a role in traffic safety and control, such as cars, trucks, motorcycles, bicycles or even pedestrians and roadside infrastructure equipment including road signs, traffic lights or barriers and gates. The awareness of each other is the basis for several road safety and traffic efficiency applications with many use cases as described in ETSI TR 102 638. It is achieved by regular broadcasting of information among the road users, from vehicle to vehicle (V2V), but also from infrastructure to any road user, V2I, I2V or X2X based on wireless networks, called V2X network and as such is part of Intelligent Transport Systems (ITS).

Cooperative safety and traffic efficiency applications require Intelligent Transportation System (ITS) sub-systems (road users, roadside units, etc.) and their ITS-Stations (ITS-Ss) to develop situational awareness that includes the presence and behavior of road users in their vicinity. Vehicle sub-systems and roadside sub-systems develop their situational awareness from their perception sensors and through communication with other surrounding ITS-Ss. The CA basic service EN 302 637-2, is a European Norm (EN) that specifies how an ITS-S can inform others about its associated sub-systems position, dynamics and attributes by sending Cooperative Awareness Messages (CAMs) according to EN 302 637-2.

The Collective Perception service (CP service or CPS) complements the CA basic service. The CPS specification defines how an ITS-S can inform others about the position, dynamics and attributes of neighboring road users, other objects, and free-space detected by local perception sensors. The CPS enables ITS sub-systems to share information about other road users and obstacles that were detected by local perception sensors such as radars, cameras and the like. In that sense, it aims at increasing awareness between ITS sub-systems by mutually contributing information about their perceived objects to the individual knowledge base of the sub-system.

The Collective Perception Message (CPM) enables sharing of information about detected objects by the disseminating ITS sub-system. The message consists of information about the disseminating ITS sub-system, its sensory capabilities and its detected objects. For this purpose, the message provides generic data elements to describe detected objects in the reference frame of the disseminating ITS sub-system. The CPM is transmitted cyclically with adaptive message generation rates to decrease the resulting channel load while focusing on reporting changes in the dynamic road environment.

In particular, draft ETSI Technical Specification ETSI TS 103 324, currently in the form of V0.0.22 draft (2021 May), focuses on the specifications of CPMs transmitted by ITS-Ss participating in the V2X network and the specification of the CPS with trigger conditions for sending CPMs.

As used herein, an object in the context of the CPS is defined as the state space representation of a physically detected object within a sensor's perception range, an object list is defined as a collection of objects temporally aligned to the same timestamp, the Collective Perception (CP) Service is defined as a facility at the ITS-S facilities layer to generate, receive and process CPMs, the Collective Perception Message (CPM) is defined as a CP service PDU (Protocol Data Unit), Collective Perception Message (CPM) data is defined as a partial or complete CPM payload, the Collective Perception (CPM) protocol is defined as the ITS facilities layer protocol for the operation of the CPM transmission and reception, an ITS station is defined as a functional entity specified by the ITS station (ITS-S) reference architecture, an Object confidence is defined as a quantification of the confidence that a detected object actually exists, i.e., has been detected previously and has continuously been detected by a sensor, a Roadside ITS station is defined as an ITS station in a roadside ITS sub-system, a Sensor Measurement is defined as the operation of a sensor based on its working principle to generate a state space representation for detected objects, a State Space Representation is defined as the mathematical description of a detected object consisting of state variables such as distance, speed, object dimensions, etc., and a Vehicle ITS station is defined as an ITS station in a vehicular ITS sub-system. CPU(s) in an ITS-S carry out the respective layer functions, namely application layer, facilities layer, and network and transport layer.

FIG. 2 depicts in more detail the Collective Perception (CP) service within the ITS S architecture along with the logical interfaces to other layers and entities within the Facilities layer. The CPS is a Facilities layer entity in the ITS-S-S architecture. It interfaces with other entities of the Facilities layer and with ITS applications to collect relevant information for CPM generation and for forwarding received CPM content for further processing.

The entities for the collection of data to generate a CPM are the Device Data Provider (DDP), the Position and Time management (POTI) and the Local Dynamic Map (LDM). For vehicle ITS sub-systems, the DDP is connected with the in-vehicle network and provides the vehicle state information. For roadside ITS sub-systems, the DDP is connected to sensors mounted on the roadside infrastructure such as poles or gantries. The POTI entity provides the position of the ITS-S and time information. The LDM is a database in the ITS-S, which in addition to on-board sensor data is configured to be updated with received data from message such as CAM and CPM. ITS applications retrieve information from the LDM for further processing. The CPS also interfaces with the Service Announcement (SA) Service to indicate an ITS-S's ability to generate CPMs and to provide details about the communication technology/ies used.

Message dissemination-specific information related to the current channel utilization are received by interfacing with the DCC-FAC (Decentralized Congestion Control for Facility Layer) entity and the DCC-Cross entity (located in the Management plane, not shown in FIG. 2). The CPS interfaces through the NF-SAP (SAP for Networking-Facility layer interface) with the networking & transport layer (N&T) for exchanging of CPMs with other ITS-Ss, the SF-SAP (SAP for Security-Facility layer interface) with the Security entity to access security services for CPM transmission and CPM reception, the MF-SAP (SAP for Management-Facility layer interface) with the Management entity and the FA-SAP (SAP for Facility-Application layer interface) with the application layer if received CPM data is provided directly to the applications. It is noted that SAP stands for Service Access Point, and that SA stands for Service Announcement.

As shown in FIG. 3, the CPS functions in a respective ITS-S encompass CPM transmission management, CPM reception management, CPM encoding and CPM decoding based on input from the DCC (including e.g. information about available channel resources), from on-board sensors (including e.g. information about sensor characteristics, FOVs, objects, free-space), CAMs and CPMs (from outside the respective ITS-S, e.g. from one or more other ITS-Ss).

Figure 4:
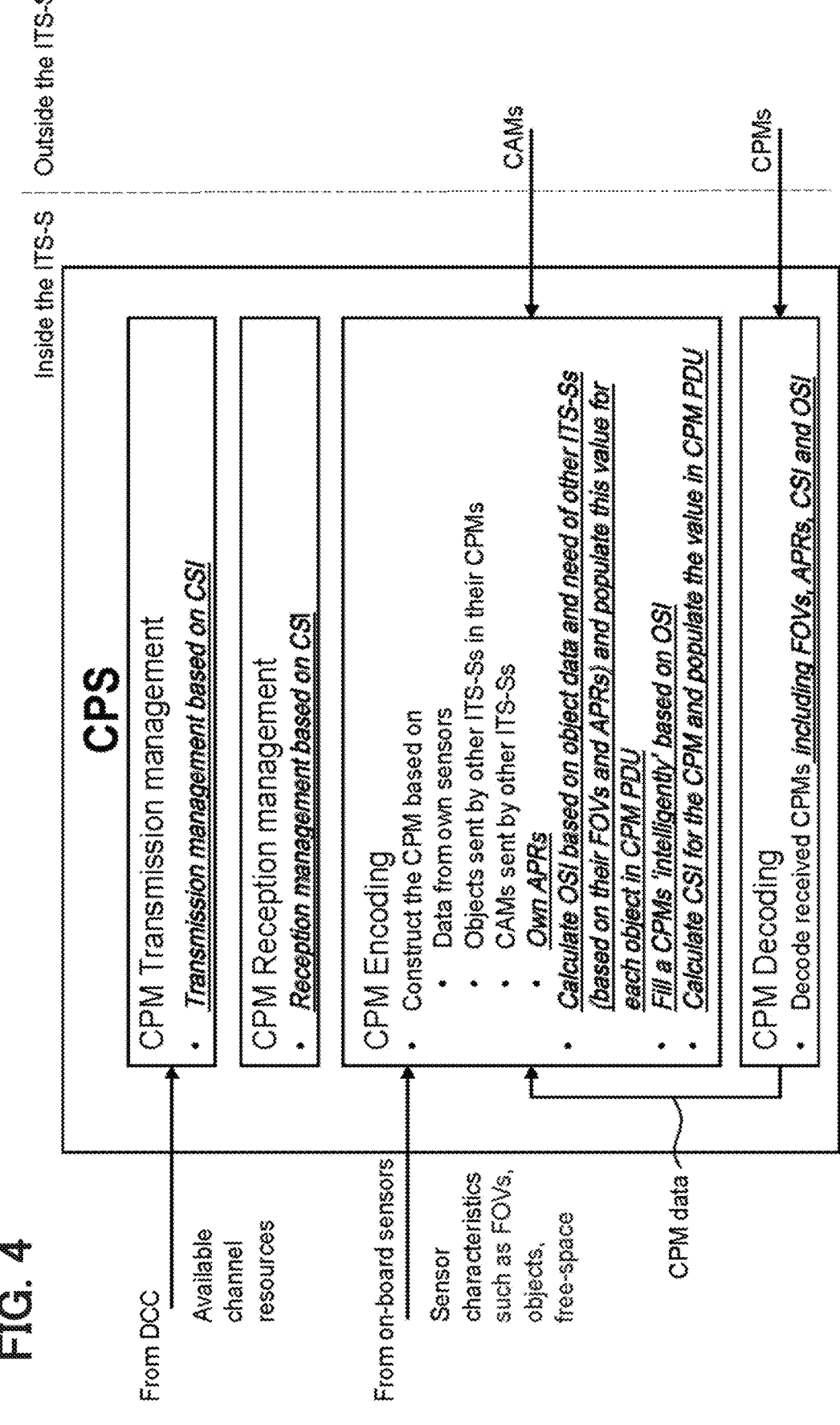
FIG. 4 illustrates changes to CPS functions according to an embodiment in comparison to FIG. 3.

FIG. 4 illustrates changes to CPS functions according to the embodiment in comparison to FIG. 3. The changes are marked in underlined bold italics in FIG. 4 and will be referred to in greater detail hereinbelow.

Figure 5:
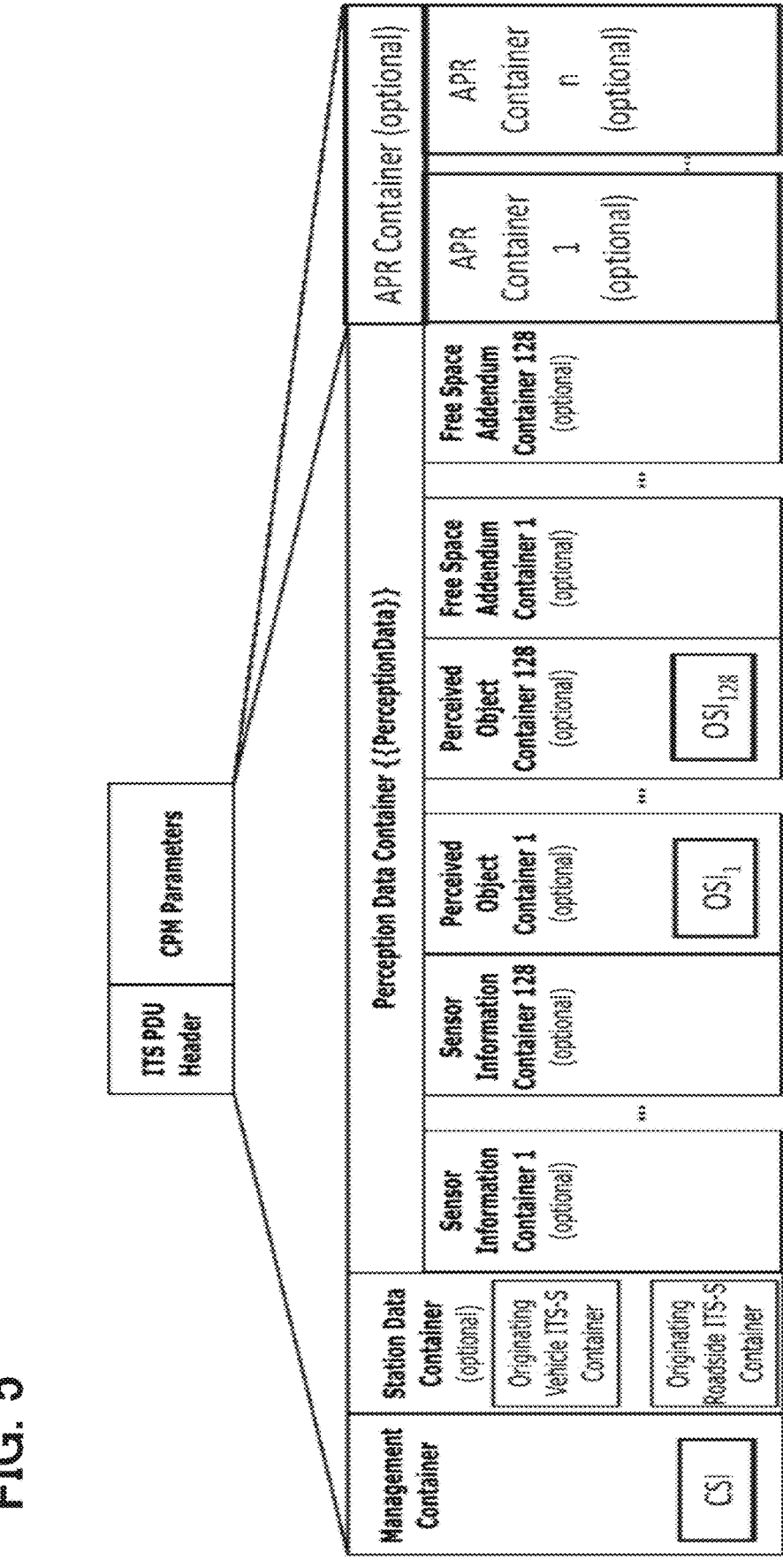
FIG. 5 depicts, in a general overview, where additions according to the embodiment may suitably weave into the current ETSI CPM format.

FIG. 5 illustrates a current state of the ETSI CPM format and identifies where the present disclosure might weave into this format. Current ETSI developments to specify the CPS service are described in a Technical Report describing the CPM format and the CPM generation rules as a baseline for the specification of CPS in ETSI TS 103 324.

As shown in FIG. 5, CPM messages include an ITS (Intelligent Transport Systems) PDU (Protocol Data Unit) header and 4 types of containers: A Management Container, a Station Data Container, a plurality of Sensor Information Containers (SICs) and a plurality of Perceived Object Containers (POCs).

The ITS PDU header includes data elements like a protocol version, a message ID and a Station ID. The Management Container is mandatory and provides basic information about a transmitting vehicle (such as the position thereof). Position information is used by a receiver to reference detected objects. The Station Data Container is optional and includes additional information about the transmitting vehicle (e.g., its speed, heading, or acceleration). In addition, a CPM can include up to 128 SICs to describe the capabilities of sensors embedded in the transmitting vehicle. Finally, the POCs provide information about detected objects (e.g., a distance between the detected object and the transmitting vehicle), a speed and dimensions of an object, and the time at which these measurements were done. A single CPM can include up to 128 POCs.

The CPM generation rules define when a vehicle should generate and transmit a CPM and the information to be included in the CPM. Current ETSI CPM generation rules establish that a vehicle has to check in predetermined intervals if a new CPM should be generated and transmitted. By default, the predetermined interval is set to 100 ms although it can be any multiple of 100 ms in the range between 100 ms and 1000 ms. For every predetermined interval, a vehicle should generate a new CPM if it has detected a new object, or if its absolute position has changed by more than a predetermined amount, e.g. 4 m, since the last time its data was included in a CPM, or if its absolute speed has changed by more than a predetermined value, e.g. 0.5 m/s, since the last time its data was included in a CPM, or if the last time the detected object was included in a CPM was a predetermined period of time, e.g. 1 (or more) seconds, ago. A vehicle includes in a new CPM all new detected objects and those objects that satisfy at least one of the previous conditions. The vehicle still generates a CPM every second even if none of the detected objects satisfy any of the previous conditions. The information about the onboard sensors is included in the CPM only once per second.

According to FIG. 5, as further shown, the present disclosure might weave into the pending ETSI CPM format at the Management Container (cf. a box marked CSI ("CPM-SI")), at the POCs (cf. boxes marked OSI ("O-SI") with indices 1 to 128), and by optionally adding new APR Containers 1 to n, cf. the right-hand side of FIG. 5.

In the above context, FIG. 6 illustrates the interlinking of CPM transmission and DCC in an ITS-S at layers of the ETSI ITS stack including the concept of a significance index introduced into CPMs according to the embodiment. At a step 10 in FIG. 6, the CPS receives data from sensors and/or CAMs/CPMs of other ITS-Ss. At a step 20, after the CPS has received the data from sensors and/or the CAMs/CPMs of other ITS-Ss at step 10, the CPM is filled with object data of the objects according to an object significance index (O-SI). At a step 30, an SI for detected objects is calculated. At a step 40, the CPS creates a CPM, wherein the CPM size and rate are adapted based on channel congestion information from DCC. At a step 50, the CPM traverses the stack through the networking layer to the access layer. At a step 60, the access layer either sends or drops the CPM depending on the current channel load (Access Layer DCC function DCC-ACC).

The present disclosure has a plurality of aspects, an overview of which is given in the following:

Within the context of CPS functions, which according to FIG. 3 encompass CPM transmission management, CPM reception management, CPM encoding and CPM decoding, the existing CPS functions are expanded and/or adapted by incorporating a significance index (SI).

Concomitantly with the incorporation of the SI, which as such serves to avoid loss of significant information, a significance of a CPM is based on the significance index (SI) of the object information within for the CPS to adaptively include (depending on the current V2X channel load) only the most significant objects (e.g., from a safety point of view) within a CPM.

Here, it is conceivable that other ITS-Ss than an (own) host ITS-S can influence the SI calculation of the host ITS-S by sending a request for an area for which they want to receive object information, and further other applications within the C-ITS system, such as on-demand CPM transmission, are conceivable as well.

The SI may be calculated by the CPS based on data obtained at a host ITS-S about a detected object, wherein such data include at least one of kinematics, novelty, time elapsed since last update, classification, confidence of detection, and/or based on the need of other ITS-Ss.

As used herein, kinematics includes at least one of position, speed, and acceleration, without being limited thereto, i.e., parameters that are suitable to indicate the likelihood for an object to be a safety hazard for one or more road user(s). For example, in a case where one vehicle is moving slow and another vehicle is moving fast and a likelihood of the faster vehicle being a safety hazard is determined, then the higher the likelihood of being a safety hazard is, the higher is the significance thereof.

As used herein, novelty means an object not having been detected previously. A novel object increases the significance. Time elapsed since last update relates to an object having not been reported for a predetermined time. The longer the time elapsed is, the higher is the significance thereof. Classification generally refers to object types and takes into account higher 'value' objects such as vulnerable road users (VRUs). Accordingly, the significance is determined to be higher for classes including such higher value objects. Likewise for a confidence of detection (value), the higher the confidence (value) is, the higher is the significance thereof.

Figure 7:
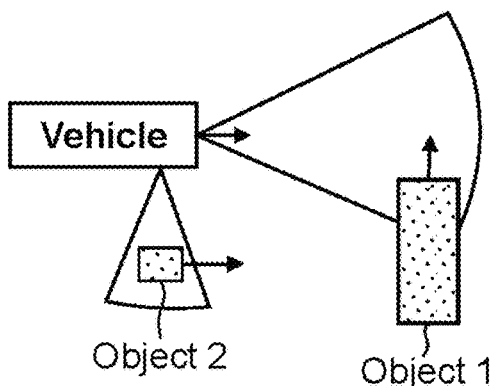
FIG. 7 illustrates an exemplary vehicle setup in the embodiment where object significance is determined based on kinematics and a single vehicle.

As for the need of other ITS-Ss, an object with kinematics (e.g., position, speed, acceleration), especially in relation to one or more road user(s) (vicinity, collision path, and so on), may be taken into account when determining the object significance. FIG. 7 shows an illustrative example where, when a vehicle ITS-S detects a first object (Object 1) and a second object (Object 2), the first object is considered more significant than the second object due a potential collision path with the first object but not with the second object.

Figure 8:
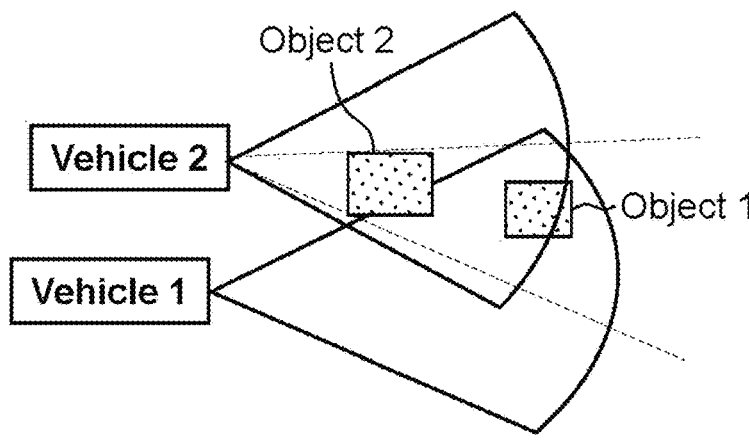
FIG. 8 illustrates another exemplary vehicle setup in the embodiment where object significance is determined based on object occlusion and two vehicles.

Also, with respect to the need of other ITS-Ss, objects that are difficult or impossible to be detected by a neighboring ITS S, e.g., occluded objects that are partially or fully hidden based on the positions of the other known objects and the FOVs of the sensors of the known neighboring vehicles may also be taken into account when determining the object significance. FIG. 8 shows an illustrative example where in a traffic environment including a first and a second vehicle and a first and a second object, the first object (Object 1) is considered more significant than the second object (Object 2) by the first vehicle (Vehicle 1) because for the FOV of the sensor of the second vehicle, the first object is occluded by the second object.

Figure 9:
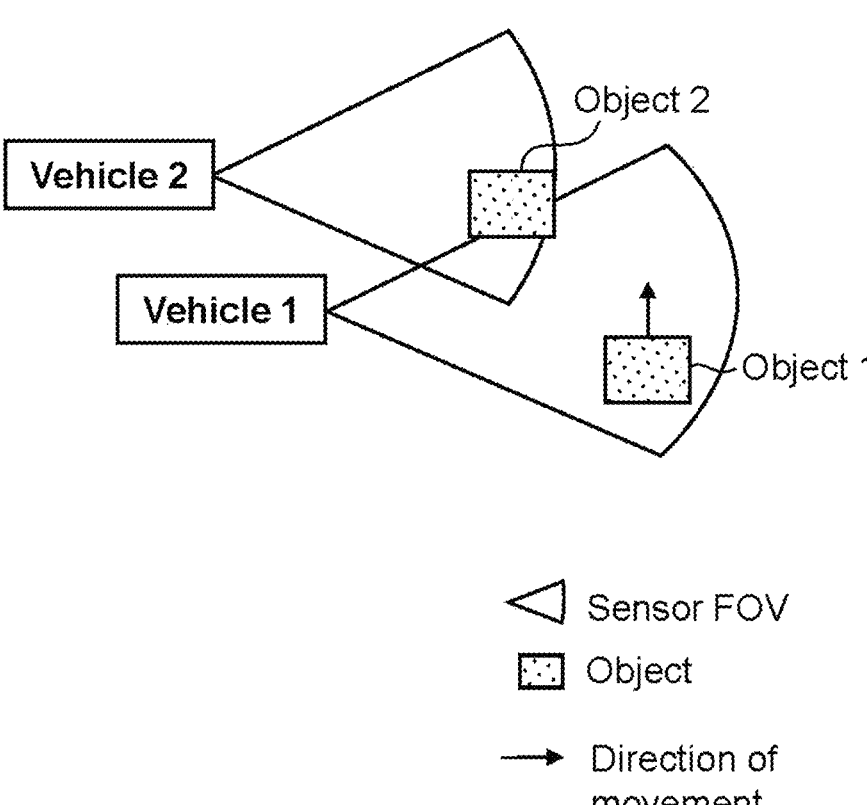
FIG. 9 illustrates another exemplary vehicle setup in the embodiment where object significance is determined based on (partially) outside FOV determination and two vehicles.

Objects that are difficult or impossible to detect further include objects on the boundary or completely outside of the FOVs of the sensors of the neighboring ITS-S and objects that have been detected by other ITS-Ss with less confidence than that of the host ITS-S, without being limited thereto. FIG. 9 shows an illustrative example where in a traffic environment including a first and a second vehicle and a first and a second object, the first object (Object 1) is considered more significant than the second object (Object 2) by the first vehicle (Vehicle 1) because the first object is completely outside the FOV of the second vehicle (Vehicle 2).

Also, with respect to the need of other ITS-Ss, objects whose detected location differs between different ITS-S, including a vehicular ITS-S type object whose location in its CAM differs from that detected by the sensors of another ITS-S, may be taken into account when determining the object significance.

Figure 10:
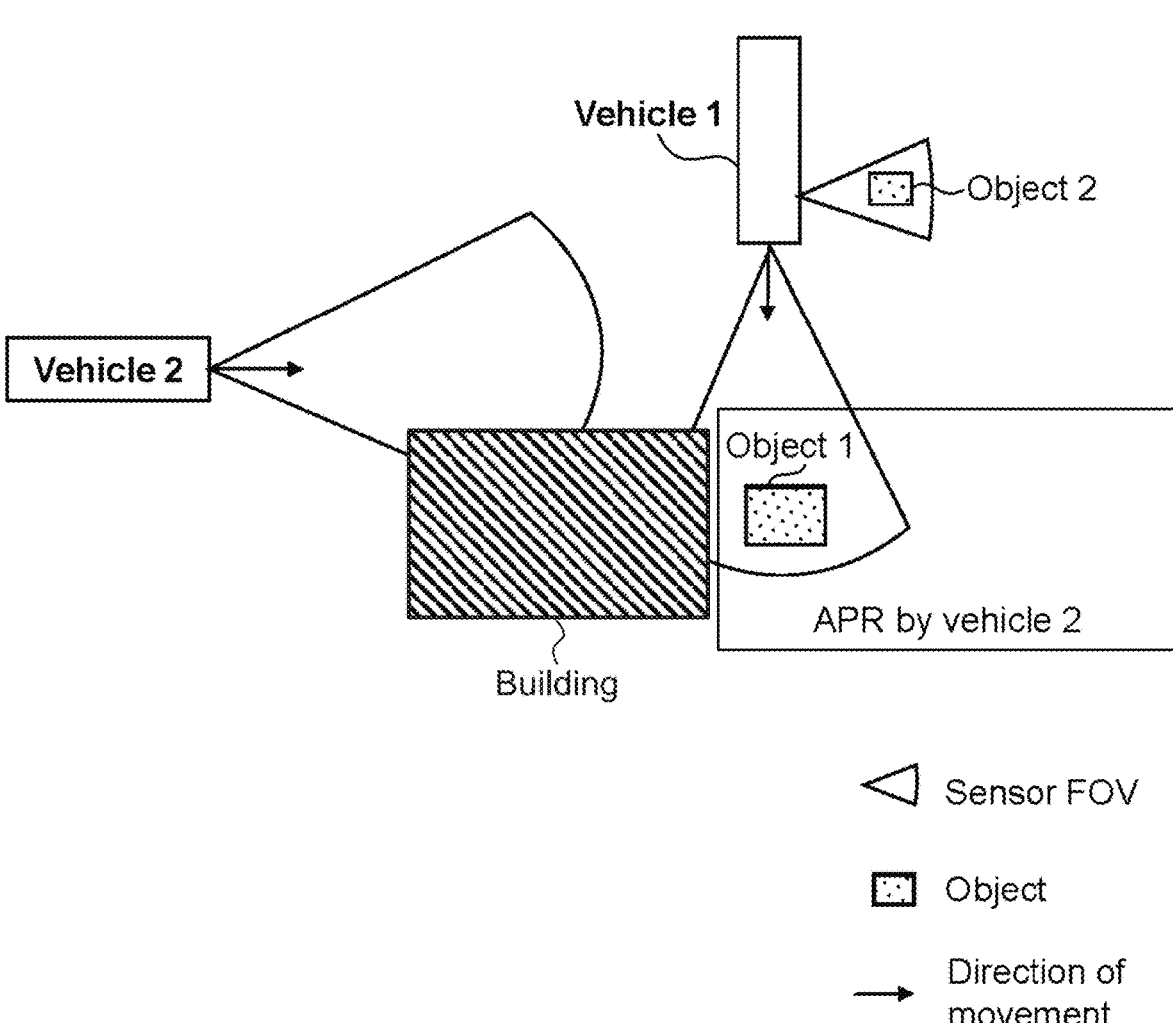
FIG. 10 illustrates another exemplary vehicle setup in the embodiment where object significance is determined for a first vehicle based on an APR area of a second vehicle.

With further respect to the need of other ITS-Ss, a number of area perception requests (APRs) by other ITS-Ss of an area in which an object detected by a host ITS-S is located, may be taken into account when determining the object significance. Here, as non-limiting examples, the request for this area may be explicitly sent out by a neighboring ITS-S, and/or the request may be part of an optional container within the CPM where the sending ITS-S can indicate the area for which it would like to receive object information. FIG. 10 shows an illustrative example where in a traffic environment including a first and a second vehicle, a first and a second object and e.g., a building, the first object (Object 1) is deemed more significant than the second object (Object 2) by the first vehicle (Vehicle 1) because the first object falls in an area perception request (APR) area of the second vehicle (Vehicle 2).

Figure 11:
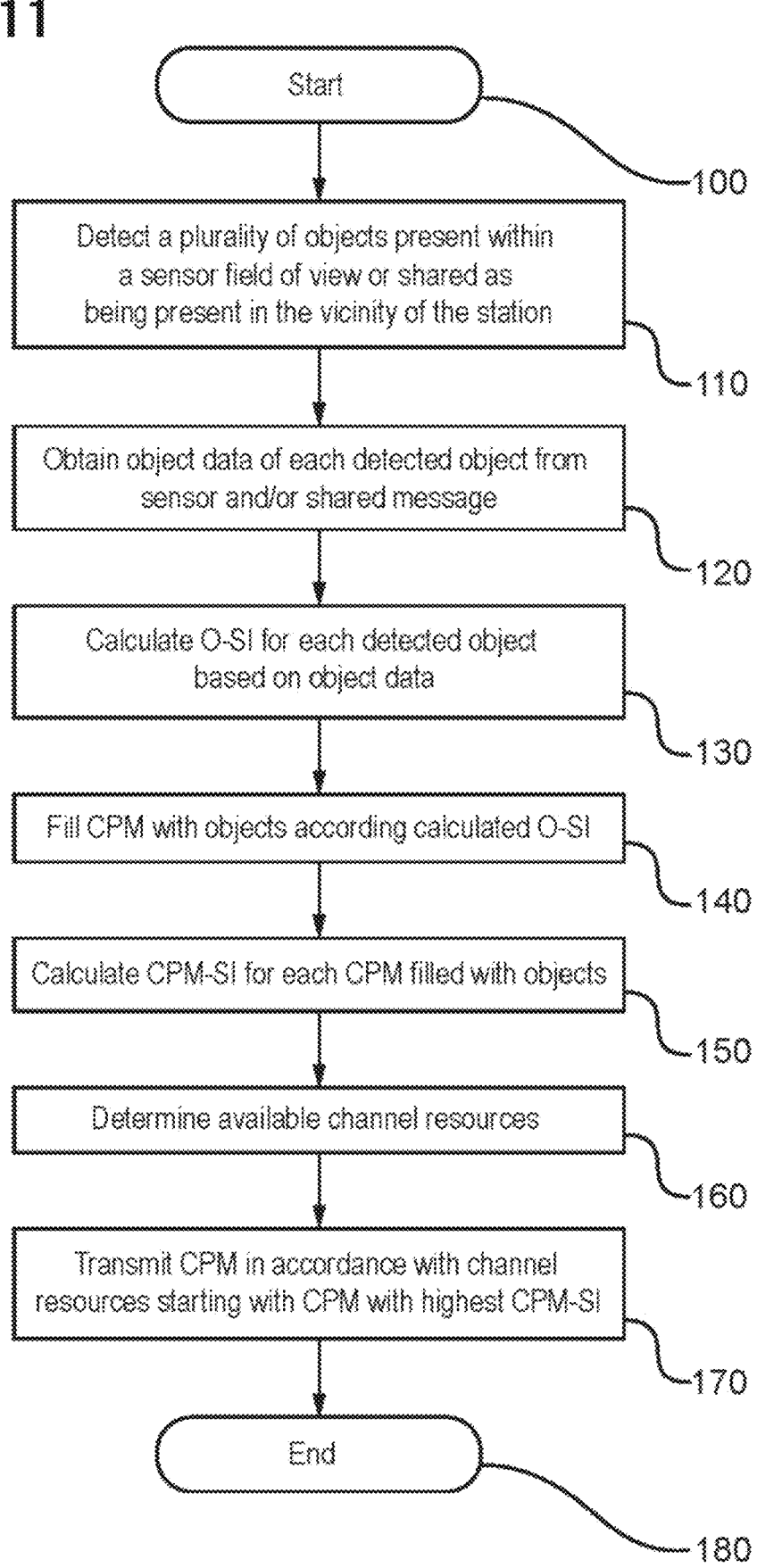
FIG. 11 shows an illustrative flow chart of a method according to the embodiment.

FIG. 11 shows an illustrative flow chart of a method according to the embodiment.

Once started in a step 100, the method steps for calculating and transmitting the significance index (SI) at the CPS include a step 110 in which a plurality of objects present within a field of view (FOV) of at least one sensor provided at a respective station or included in a shared message received from another station as being present in the vicinity of the station are detected.

Then, in a step 120, object data (kinematics and trajectory, if applicable) of each detected object from the at least one sensor, and/or the shared message, including objects detected via CAMs, is obtained.

It is noted that the shared message includes CPMs obtained from other ITS-Ss, including the FOVs and/or APRs from these stations. It is further noted that in case of limited processing capacity and where CPMs obtained from other ITS-Ss include a collective perception message significance index (CPM-SI), the arrangement may be such that CPMs with a high CPM-SI are processed first.

In a subsequent step 130, a collective perception message (CPM) is filled with object data of the objects. As a non-limiting example, a simple filling model starts the filling with a most significant object and continues with lesser significant objects, respectively, as CPM construction rules about the CPM size permit.

In a step 140, a collective perception message significance index (CPM-SI) for each collective perception message (CPM) filled with object data of the objects is then calculated. In other words, this step calculates and populates the CPM SI for each CPM. A non-limiting simple model example includes taking the average of O-SIs of all the objects within. It is noted that the O-SI and the CPM-SI are both integer type parameters with values from e.g., 1 to 10. The CPM-SI may be further abbreviated to and termed "CSI".

A following step 150 determines available channel resources of the wireless communication channel.

Finally, in a step 160, collective perception messages (CPMs) are transmitted in accordance with the available channel resources starting with a CPM with the highest collective perception message significance index (CPM-SI). In case of a congested channel, the CPMs may be sent out starting with the highest CPM-SI until the available channel resources (as decided upon by the DCC entity) are exhausted.

In a modification, in a next step following step 120, an object significance index (O-SI) for each detected object is calculated based on the object data. Here, the calculation is performed based on the various factors described above. As a non-limiting example, a simple calculation model includes adding the values for different factors and normalizing the result to 1 to 10 in order to obtain an SI value. Then, in step 130, a collective perception message (CPM) is filled with object data of the objects in accordance with their calculated object significance index. As a non-limiting example, a simple filling model starts the filling with a most significant object and continues with lesser significant objects, respectively, as CPM construction rules about the CPM size permit. It is noted that calculating the O-SI and filling a CPM with object data of the objects in accordance with their O-SI is an exemplary way to calculate the CPM-SI. Other ways of calculating the CPM-SI are conceivable and the way disclosed as a modification herein imposes no limitation on how the priority of CPMs is determined.

In this embodiment, thanks to CPM-SI CPMs are transmitted in accordance with the available channel resources starting with a CPM with the highest collective perception message significance index (CPM-SI). CPM-SI can reduce the possibility that the important CPM are discarded.

The technical effect of O-SI resides in a reduction and/or limitation of the CPM size by adaptively including only the most significant objects within a CPM and thereby reducing the V2X wireless channel load. The most significant objects to populate a CPM with are identified based on their calculated O-SI. Adaptively including only the most significant objects within a CPM, e.g., based on a significance inclusion threshold or the like, prevents the CPM from containing a large number of detected objects, mitigates redundant information, reduces the CPM size, occupies less (or frees up) capacity with respect to particularly a (potentially or actually) congested V2X wireless channel and prevents packets with significant information about highly relevant objects from being dropped. Criteria for the adaptive inclusion include a current channel load and a safety point of view, without being limited thereto. Reducing the number of objects within a CPM by adaptive inclusion of objects as described herein also reduces the processing load and allows for faster response times.

APR Containers support a like or similar technical effect in that other ITS-Ss influence the SI calculation at a host ITS-S by requesting, using an APR, information for an area for which they want to receive object information. In other words, objects in an area of interest requested from another ITS-S may be ranked more significant at the host ITS-S so that information about such objects may be prioritized and be sent out while objects in other areas (of determinable lesser interest to other ITS-S) may be ranked lower. Again, objects ranked more significant will be prioritized during the adaptive inclusion and likewise support the effects described above.

The present disclosure has been described using one embodiment thereof. It is, however, understood that the present disclosure is not limited to the specifically described embodiment and can include and cover additional aspects, configurations and modifications without departing from the scope of the subject matter described and claimed. Such additional aspects, configurations and modifications may, for example, include a method, a computing program, and an equipment for calculating an SI for each of CPMs based on an SI of the objects within, populating an SI value within a CPM packet, and filling a CPM with objects based on their individual SIs.

Such additional aspects, configurations and modifications may, for example, further include a method, a computing program, and an equipment for calculating an SI for each of objects based on parameters within object data, such as kinematics of the object, object history, visibility, detectability, and quality of detection of the object, and/or classification of the object; a method, a computing program, and an equipment for calculating an SI for each of objects based on a number of APRs from other ITS-Ss of an area in which an object detected by host ITS-S is located; or based on a combination of respective information.

Still further aspects, configurations and modifications may, for example, relate to a method, a computing program, and an equipment for composing, transmitting, receiving, and decoding an ITS message or part of an ITS message containing information about the geographical area which is only partially or not at all detected by the sensors of the sender ITS-S, and/or a criticality of the above area for the sender ITS-S, and/or a method, a computing program, and an equipment for deciding to transmit a CPM based on its SI and the available channel resources.

In general, embodiments of the present disclosure may be implemented in hardware or special purpose circuits, software, logic or any combination thereof. For example, some aspects may be implemented in hardware, while other aspects may be implemented in firmware or software which may be executed by a controller, microprocessor or other computing device, although the present disclosure is not limited thereto. While various aspects of the present disclosure may be illustrated and described as block diagrams, flow charts, or using some other pictorial representation, it is well understood that blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of this disclosure may be implemented by computer software executable by a data processor of a system entity, such as in the processor entity, or by hardware, or by a combination of software and hardware. Further in this regard it should be noted that any blocks of logic flow shown in the figures may represent program steps, or interconnected logic circuits, blocks and functions, or a combination of program steps and logic circuits, blocks and functions. The software may be stored on physical media such as memory chips, or memory blocks implemented within the processor, magnetic media such as hard disk or floppy disks, and optical media such as for example DVD and the data variants thereof, CD.

Memory may be of any type suitable to the local technical environment and may be implemented using any suitable data storage technology, such as semiconductor based memory devices, magnetic memory devices and systems, optical memory devices and systems, fixed memory and removable memory. Data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples.

Embodiments of the disclosures may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Electronic Design Automation (EDA) programs and tools automatically route conductors and locate components on a semiconductor chip using well established rules of design as well as libraries of pre stored design modules. Once the design for a semiconductor circuit has been completed, the resultant design, in a standardized electronic format may be transmitted to a semiconductor fabrication facility or "fab" for fabrication.

The description so far has provided by way of an exemplary and non-limiting example a full and informative description of the exemplary embodiment of this disclosure. However, various modifications and adaptations may become apparent to those skilled in the relevant art in view of the foregoing description, when read in conjunction with the accompanying drawings and the appended claims. It is understood that all such and similar modifications of the teachings of this disclosure will still fall within the scope of this disclosure as defined in the appended claims.

With the present disclosure as described above, in a method, a cooperative intelligent transport system and a computer-implemented system for exchanging information in a cooperative intelligent transport system between stations in the cooperative intelligent transport system (C-ITS) using a wireless communication channel, the exchanging of information comprising transmitting, receiving, processing and/or discarding a collective perception message (CPM) containing information about on-board sensors and/or objects detected by the on-board sensors within a traffic environment, a plurality of objects present within a field of view (FOV) of at least one sensor provided at a respective station or included in a shared message received from another station as being present in the vicinity of the station is detected, object data of each detected object from the at least one sensor and/or the shared message are obtained, a collective perception message (CPM) is adaptively filled with object data of the objects, a collective perception message significance index (CPM-SI) is calculated for each collective perception message (CPM) filled with object data of the objects, available channel resources of the wireless communication channel are determined, and collective perception messages (CPMs) are transmitted and/or received in accordance with the available channel resources starting with a CPM with the highest collective perception message significance index (CPM-SI).

What is claimed is:

1. A method of exchanging information in a cooperative intelligent transport system between stations in said cooperative intelligent transport system using a wireless communication channel, said exchanging of information comprising transmitting, receiving, processing and/or discarding a collective perception message containing information about on-board sensors and/or objects detected by said on-board sensors within a traffic environment, the method comprising:

detecting a plurality of objects present within a field of view of at least one sensor provided at a respective station or included in a shared message received from another station as being present in a vicinity of the station;

obtaining object data of each detected object from said at least one sensor and/or said shared message;

filling a collective perception message with object data of the plurality of objects;

calculating a collective perception message significance index for each collective perception message filled with object data;

determining available channel resources of said wireless communication channel; and transmitting collective perception messages in accordance with the available channel resources starting with a collective perception message with the highest collective perception message significance index.

2. The method according to claim 1, further comprising calculating an object significance index for each detected object based on said object data, wherein the filling of a collective perception message with object data of the objects is performed in accordance with their calculated object significance index.

3. The method according to claim 2, wherein the object significance index is calculated by adding values for different object data factors and normalizing a result to an integer type significance index value.

4. The method according to claim 2, wherein the collective perception message significance index is calculated by taking an average of object significance indices of all of the plurality of objects within the collective perception message, and is an integer type parameter with a value.

5. The method according to claim 2, wherein said object significance index is calculated based on at least one of kinematics of an object, a novelty of detection of an object, an elapsed time since a last update of an object, a classification of an object, or a confidence of detection of an object.

6. The method according to claim 2, wherein said object significance index is calculated based on a need of other stations, and said need includes at least one of kinematics of an object, a difficulty or impossibility of detection by a neighboring station, a condition of occlusion of an object, an object being on a boundary or outside of a field of view of a sensor in a neighboring vehicle, a low confidence of detection at a neighboring station, or differing detected locations between different stations.

7. The method according to claim 1, wherein the wireless communication is direct vehicle-to-everything communication.

8. The method according to claim 1, wherein the collective perception messages are sent out periodically.

9. The method according to claim 1, wherein the available channel resources are in relation to a channel load, and when the channel load is determined to be above a predetermined threshold value indicating a congested channel, the collective perception messages are transmitted starting with a collective perception message with the highest collective perception message significance index.

10. A cooperative intelligent transport system for exchanging information between stations in said cooperative intelligent transport system using a wireless communication channel, said exchanging of information comprising transmitting, receiving, processing and/or discarding a collective perception message containing information about on-board sensors and/or objects detected by said on-board sensors within a traffic environment, the cooperative intelligent transport system comprising:

at least one sensor provided at a respective station and arranged to detect a plurality of objects present within a field of view;

a reception unit arranged to receive a shared message from another station as, said shared message including information on at least one object being present in a vicinity of the station;

a data obtaining unit arranged to obtain object data of each detected object from said at least one sensor and/or said shared message;

a filling unit arranged to fill a collective perception message with object data of the plurality of objects;

a second calculating unit arranged to calculate a collective perception message significance index for each collective perception message filled with object data of the plurality of objects;

a determining unit arranged to determine available channel resources of said wireless communication channel; and a transmission unit arranged to transmit collective perception messages in accordance with the available channel resources starting with a collective perception message with the highest collective perception message significance index.

11. The cooperative intelligent transport system according to claim 10, further comprising a first calculating unit arranged to calculate an object significance index for each detected object based on said object data, wherein the filling unit is arranged to fill a collective perception message with object data of the plurality of objects in accordance with their calculated object significance indices.

12. A computer-implemented system for exchanging of information in a cooperative intelligent transport system between stations in said cooperative intelligent transport system using a wireless communication channel, said exchanging of information comprising transmitting, receiving, processing and/or discarding a collective perception message containing information about on-board sensors and/or objects detected by said on-board sensors within a traffic environment, said computer-implemented system comprising a memory for storing instructions which, when carried out by a processor, cause the processor to perform:

detecting a plurality of objects present within a field of view of at least one sensor provided at a respective station or included in a shared message received from another station as being present in a vicinity of the station;

obtaining object data of each detected object from said at least one sensor and/or said shared message;

filling a collective perception message with object data of the plurality of objects;

calculating a collective perception message significance index for each collective perception message filled with object data of the plurality of objects;

determining available channel resources of said wireless communication channel; and transmitting collective perception messages in accordance with the available channel resources starting with a collective perception message with the highest collective perception message significance index.

13. The computer-implemented system according to claim 12, wherein the instructions further cause the processor to perform:

calculating an object significance index for each detected object based on said object data; and filling a collective perception message with object data of the plurality of objects in accordance with their calculated object significance index.

* * * * *